United States Patent
Headley

(10) Patent No.: US 9,311,466 B2
(45) Date of Patent: *Apr. 12, 2016

(54) USER AUTHENTICATION FOR SOCIAL NETWORKS

(75) Inventor: Paul Headley, Hollister, CA (US)

(73) Assignee: K. Y. TRIX LTD., Kfar Mordechai (IL)

( * ) Notice: Subject to any disclaimer, the term of this patent is extended or adjusted under 35 U.S.C. 154(b) by 384 days.

This patent is subject to a terminal disclaimer.

(21) Appl. No.: 13/442,232

(22) Filed: Apr. 9, 2012

(65) Prior Publication Data

US 2012/0198532 A1  Aug. 2, 2012

Related U.S. Application Data

(63) Continuation of application No. 12/608,190, filed on Oct. 29, 2009, now Pat. No. 8,185,646.

(60) Provisional application No. 61/110,878, filed on Nov. 3, 2008.

(51) Int. Cl.
*G06F 15/16* (2006.01)
*G06F 21/32* (2013.01)
*H04L 29/08* (2006.01)
*G10L 17/22* (2013.01)

(52) U.S. Cl.
CPC ............... *G06F 21/32* (2013.01); *G10L 17/22* (2013.01); *H04L 67/306* (2013.01)

(58) Field of Classification Search
CPC .............................. G06F 21/32; H04L 67/306
USPC ....................................................... 709/229
See application file for complete search history.

(56) References Cited

U.S. PATENT DOCUMENTS

| 5,033,088 A | 7/1991 | Shipman |
| 5,805,674 A | 9/1998 | Anderson, Jr. |
| 5,841,870 A | 11/1998 | Fieres et al. |
| 5,958,016 A | 9/1999 | Chang et al. |
| 6,009,442 A | 12/1999 | Chen et al. |
| 6,021,491 A | 2/2000 | Renaud |

(Continued)

FOREIGN PATENT DOCUMENTS

| CA | 2278549 A1 | 7/1998 |
| CA | 2399961 A1 | 4/1999 |

(Continued)

OTHER PUBLICATIONS

Dictionary.com, definition of 'associate', Apr. 12, 2013, http://dictionary.reference.com/browse/associate?s=t&path=/.*

(Continued)

*Primary Examiner* — Joseph E Avellino
*Assistant Examiner* — James Conaway
(74) *Attorney, Agent, or Firm* — Peters Verny, LLP

(57) ABSTRACT

Systems and methods are provided for social networks that can verify that enrolled users are not misrepresenting facts about themselves such as age and gender. Verification can be performed, for example, by reference to biometric templates stored during the user enrollment process. The biometric templates can also be used to authenticate users logging into the social network to prevent user impersonation. The ability of some users to communicate to other users of the social network can be limited to only certified users, and even to those certified users that match a criterion, such as gender or age.

4 Claims, 7 Drawing Sheets

(56) References Cited

U.S. PATENT DOCUMENTS

| | | | |
|---|---|---|---|
| 6,256,630 B1 | 7/2001 | Gilai et al. | |
| 6,262,732 B1 | 7/2001 | Coleman et al. | |
| 6,446,210 B1 | 9/2002 | Borza | |
| 6,480,304 B1 | 11/2002 | Os et al. | |
| 6,480,825 B1 | 11/2002 | Sharma et al. | |
| 6,496,206 B1 | 12/2002 | Mernyk et al. | |
| 6,496,595 B1 | 12/2002 | Puchek et al. | |
| 6,501,966 B1 | 12/2002 | Bareis et al. | |
| 6,519,561 B1 | 2/2003 | Farrell et al. | |
| 6,529,885 B1 | 3/2003 | Johnson | |
| 6,581,042 B2 | 6/2003 | Pare, Jr. et al. | |
| 6,671,672 B1 | 12/2003 | Heck | |
| 6,697,947 B1 | 2/2004 | Matyas, Jr. et al. | |
| 6,766,295 B1 | 7/2004 | Murveit et al. | |
| 6,778,644 B1 | 8/2004 | Jenkins et al. | |
| 6,819,219 B1 | 11/2004 | Bolle et al. | |
| 6,886,095 B1 | 4/2005 | Hind et al. | |
| 6,907,408 B2 | 6/2005 | Angel | |
| 6,934,858 B2 | 8/2005 | Woodhill et al. | |
| 6,944,772 B2 | 9/2005 | Dozortsev | |
| 6,993,166 B2 | 1/2006 | Lo et al. | |
| 7,171,694 B1 | 1/2007 | Jespersen et al. | |
| 7,240,363 B1 | 7/2007 | Ellingson | |
| 7,277,891 B2 | 10/2007 | Howard et al. | |
| 7,305,700 B2 | 12/2007 | Boynton et al. | |
| 7,319,987 B1 | 1/2008 | Hoffman et al. | |
| 7,333,635 B2 | 2/2008 | Tsantes et al. | |
| 7,334,259 B2 | 2/2008 | Haala | |
| 7,349,557 B2 | 3/2008 | Tibor | |
| 7,352,868 B2 | 4/2008 | Hawkes et al. | |
| 7,383,572 B2 | 6/2008 | Rolfe | |
| 7,461,258 B2 | 12/2008 | Rolfe | |
| 7,522,751 B2 | 4/2009 | White et al. | |
| 7,545,961 B2 | 6/2009 | Ahern et al. | |
| 7,545,962 B2 | 6/2009 | Peirce et al. | |
| 7,617,522 B2 | 11/2009 | Schmidt et al. | |
| 7,634,662 B2 | 12/2009 | Monroe | |
| 7,647,498 B2 | 1/2010 | Brown et al. | |
| 7,676,439 B2 | 3/2010 | Tattan et al. | |
| 7,685,629 B1 | 3/2010 | White et al. | |
| 7,689,833 B2 | 3/2010 | Lange | |
| 7,690,032 B1 | 3/2010 | Peirce | |
| 7,698,322 B1 | 4/2010 | Langley | |
| 7,702,918 B2 | 4/2010 | Tattan et al. | |
| 7,788,730 B2 | 8/2010 | Dean et al. | |
| 7,797,545 B2 | 9/2010 | Adams et al. | |
| 7,835,548 B1 | 11/2010 | Langley | |
| 7,865,449 B2 | 1/2011 | Tattan et al. | |
| 7,865,937 B1 | 1/2011 | White et al. | |
| 7,941,380 B2 | 5/2011 | Tattan et al. | |
| 7,987,495 B2 | 7/2011 | Maler et al. | |
| 7,997,972 B2* | 8/2011 | Nguyen et al. | 463/16 |
| 8,006,291 B2 | 8/2011 | Headley et al. | |
| 8,166,297 B2 | 4/2012 | Headley | |
| 8,185,646 B2 | 5/2012 | Headley | |
| 8,347,370 B2 | 1/2013 | Headley | |
| 8,984,282 B1* | 3/2015 | Kragh | H04L 9/321 705/3 |
| 2002/0129251 A1 | 9/2002 | Itakura et al. | |
| 2002/0152179 A1 | 10/2002 | Racov | |
| 2002/0174347 A1 | 11/2002 | Ting | |
| 2003/0005326 A1 | 1/2003 | Flemming | |
| 2003/0140235 A1 | 7/2003 | Immega et al. | |
| 2003/0163710 A1 | 8/2003 | Ortiz et al. | |
| 2003/0163739 A1 | 8/2003 | Armington et al. | |
| 2003/0236978 A1 | 12/2003 | Evans et al. | |
| 2004/0100362 A1* | 5/2004 | Mohamed et al. | 340/5.82 |
| 2004/0158723 A1 | 8/2004 | Root | |
| 2005/0091338 A1 | 4/2005 | de la Huerga | |
| 2005/0114705 A1 | 5/2005 | Reshef et al. | |
| 2006/0000896 A1 | 1/2006 | Bonalle et al. | |
| 2006/0021009 A1 | 1/2006 | Lunt | |
| 2006/0041755 A1 | 2/2006 | Pemmaraju | |
| 2006/0106734 A1* | 5/2006 | Hoffman et al. | 705/64 |
| 2006/0129821 A1 | 6/2006 | Zugenmaier et al. | |
| 2006/0136219 A1 | 6/2006 | Wang | |
| 2006/0136744 A1 | 6/2006 | Lange | |
| 2006/0184800 A1 | 8/2006 | Rosenberg | |
| 2006/0212717 A1 | 9/2006 | Ito et al. | |
| 2006/0245619 A1 | 11/2006 | Sathath | |
| 2007/0022196 A1* | 1/2007 | Agrawal | G06F 21/34 709/225 |
| 2007/0055517 A1 | 3/2007 | Spector | |
| 2007/0061590 A1 | 3/2007 | Boye et al. | |
| 2007/0107016 A1 | 5/2007 | Angel et al. | |
| 2007/0107017 A1 | 5/2007 | Angel et al. | |
| 2007/0107021 A1 | 5/2007 | Angel et al. | |
| 2007/0136573 A1 | 6/2007 | Steinberg | |
| 2007/0169182 A1 | 7/2007 | Wolfond et al. | |
| 2007/0175986 A1 | 8/2007 | Petrone et al. | |
| 2007/0186106 A1* | 8/2007 | Ting et al. | 713/168 |
| 2007/0198435 A1 | 8/2007 | Siegal et al. | |
| 2007/0226516 A1 | 9/2007 | Kubota et al. | |
| 2007/0226787 A1 | 9/2007 | Maletsky et al. | |
| 2007/0241861 A1 | 10/2007 | Venkatanna et al. | |
| 2007/0255963 A1* | 11/2007 | Pizano et al. | 713/189 |
| 2008/0052527 A1 | 2/2008 | Siedlarz | |
| 2008/0077524 A1 | 3/2008 | Greene | |
| 2008/0077525 A1 | 3/2008 | Willey et al. | |
| 2008/0077526 A1 | 3/2008 | Arumugam | |
| 2008/0082451 A1* | 4/2008 | Schneider et al. | 705/64 |
| 2008/0086319 A1 | 4/2008 | Berger | |
| 2008/0086764 A1 | 4/2008 | Kulkarni et al. | |
| 2008/0091618 A1 | 4/2008 | Obrea et al. | |
| 2008/0113786 A1 | 5/2008 | Alderucci et al. | |
| 2008/0141353 A1 | 6/2008 | Brown | |
| 2009/0052745 A2 | 2/2009 | Sathath | |
| 2009/0116703 A1 | 5/2009 | Schultz | |
| 2009/0119299 A1 | 5/2009 | Rhodes | |
| 2009/0164796 A1 | 6/2009 | Peirce | |
| 2009/0259588 A1 | 10/2009 | Lindsay | |
| 2009/0313165 A1 | 12/2009 | Walter | |
| 2009/0327131 A1* | 12/2009 | Beenau et al. | 705/44 |
| 2010/0029196 A1 | 2/2010 | Tan | |
| 2010/0039218 A1* | 2/2010 | Cohen et al. | 340/5.8 |
| 2010/0107230 A1 | 4/2010 | Tyagi et al. | |
| 2010/0146604 A1* | 6/2010 | Piccionelli | 726/6 |
| 2010/0312763 A1 | 12/2010 | Peirce | |
| 2011/0035788 A1 | 2/2011 | White et al. | |
| 2011/0185405 A1 | 7/2011 | Ganesan | |
| 2011/0209200 A2 | 8/2011 | White et al. | |
| 2011/0231911 A1 | 9/2011 | White et al. | |

FOREIGN PATENT DOCUMENTS

| | | |
|---|---|---|
| EP | 1868131 A1 | 12/2007 |
| GB | 2379040 A | 2/2003 |
| WO | 0156352 A2 | 8/2001 |
| WO | 2009032036 A2 | 3/2009 |
| WO | 2009127984 A1 | 10/2009 |
| WO | 2010096628 A2 | 8/2010 |

OTHER PUBLICATIONS

EP 09824114.4 Response to Rules 70(2) and 70a(2) Communication, Nov. 25, 2013.

International Search Report and Written Opinion, PCT/US09/43363 (May 8, 2009), dated Jul. 16, 2009.

International Search Report and Written Opinion, PCT/US09/47049 (Jun. 11, 2009), dated Sep. 1, 2009.

International Search Report and Written Opinion, PCT/US09/48842 (Jun. 26, 2009), dated Aug. 3, 2009.

International Search Report and Written Opinion, PCT/US09/62490 (Oct. 29, 2009), dated Dec. 14, 2009.

International Search Report and Written Opinion, PCT/US11/58974 (Nov. 2, 2011), dated Mar. 16, 2012.

Vince Thomas et al., "Learning to Predict Gender from Iris Images," First IEEE International Conference on Biometrics: Theory, Applications, and Systems, Sep. 2007.

Jain et al., Soft Biometric Traits for Personal Recognition Systems, http://www.springerlink.com/content/5gg1c23821cevbnk/.

(56) References Cited

OTHER PUBLICATIONS

Ambalakat, Security of Biometric Authentication Systems, 2005, http://www.ewp.rpl.edu/hartford/~rhb/cs_seminar_2005/SessionA1/ambalakat.pdf.

EP 09747255.9 European Supplementary Search Report, dated Jun. 28, 2012.

EP 12180301.9 Extended European Search Report, dated Dec. 6, 2012.

Chenafa, M. et al., "Biometric System Based on Voice Recognition Using Multiclassifiers," Biometrics and Identity Management, Springer Berlin, pp. 206-215, May 5, 2008.

Tan, T. G., "Phising Redefined—Preventing Man-in-the-Middle Attacks for Web-based Transactions," http://www.dssasia.com, Mar. 2005.

EP 09824114.4 Extended European Search Report, Apr. 29, 2013.

* cited by examiner

USER AUTHENTICATION FOR SOCIAL NETWORKS

CROSS-REFERENCE TO RELATED APPLICATIONS

This application is a continuation of U.S. patent application Ser. No. 12/608,190 filed Oct. 29, 2009, now U.S. Pat. No. 8,185,646 also entitled "User Authentication for Social Networks," and which claims the benefit of U.S. Provisional Patent Application 61/110,878 filed Nov. 3, 2008 and is also entitled "Identity Authentication for Social Networks," both of which are incorporated herein by reference. This application also incorporates by reference U.S. patent application Ser. No. 12/119,617 filed May 13, 2008 and entitled "Multi-Channel Multi-Factor Authentication" and U.S. patent application Ser. No. 12/137,129 filed Jun. 11, 2008 and entitled "Single-Channel Multi-Factor Authentication."

BACKGROUND OF THE INVENTION

1. Field of the Invention

The present invention relates generally to the field of authentication and more particularly to authenticating users of social networks.

2. Description of the Prior Art

Social networking Internet sites (hereinafter "social networks") such as MySpace and Facebook allow individuals to connect over the Internet for various purposes from business networking, to sharing common interests, to dating. Individuals generally have the ability to represent themselves however they choose, through these social networks, simply by creating an account and providing whatever details they would like to share with the other users of the social network.

While many individuals are honest in their self-representations, other individuals attempt to pass themselves off as being older or younger than they really are, or of a different gender, for example. Often, such misrepresentations are done for the purpose of taking advantage of other users of the social network, especially children, sometimes for criminal ends.

An additional problem that has arisen in social networks is the problem of impersonation, where someone gains unauthorized access to an existing account of a legitimate user. With the unauthorized access, the impersonator can post content and/or communicate with other users, typically in a manner that the legitimate user would find objectionable. Such impersonations can both damage the reputation of the legitimate user and harm other users.

SUMMARY

The present invention provides various social network system. In an exemplary social network system, the system comprises both enrollment logic and authentication logic. The enrollment logic is configured to enroll users in the social network by associating each user with a unique user ID, by further associating a plurality of prompts with each user ID, and by further associating a plurality of biometric templates each with one of the plurality of prompts. The enrollment logic is further configured to receive an indication of each user's gender and/or age and verify each user's gender by analyzing a biometric template from the plurality of biometric templates associated with each user. In this way the enrollment logic can certify users. Users that do not wish to be enrolled in this manner may still be enrolled in the social network, but would not be treated as a certified user of the social network.

In various embodiments the enrollment logic is further configured to enroll users by receiving an indication of the user's age and verifying the user's age by analyzing the same biometric template that was used to verify the user's gender. In other embodiments, the enrollment logic is further configured to compare a biometric template of each user against a plurality of biometric templates of barred users, and to deny enrollment to any user based on a match between their biometric template and one of the plurality of biometric templates of a barred user.

The authentication logic of the exemplary system is configured to authenticate a claimant as a particular user by receiving a claimant target, sending a prompt from a plurality of prompts associated with the claimant target, receiving a biometric response to the prompt, and determining a match between the biometric response and a biometric template associated with the prompt. Various embodiments of the exemplary system further comprise logic configured to authenticate a first user to a second user by sending at least a portion of the biometric response of the first user, or at least a portion of a biometric template of first user, to the second user.

The present invention also provides methods for maintaining a social network. An exemplary such method comprises enrolling users in the social network, wherein enrolling users includes storing in association with a user ID for each enrolled user a voice template, a facial recognition template, and either the user's gender or the user's age. The exemplary method further comprises certifying enrolled users by using their voice template or their facial recognition template to verify their gender and/or age, and indicating to users of the social network which other users are certified. The exemplary method can further comprise restricting some users to communicate only with certified users, such as those that meet a criterion like gender or age.

The present invention also provides methods for enrolling a user in a social network. An exemplary enrollment method comprises associating the user with a user ID, associating a plurality of prompts with the user ID, and associating a plurality of biometric templates each with one of the plurality of prompts. In various embodiments the method further comprises receiving an indication of the user's gender, age, or both, and then verifying the user's gender, age, or both by comparing the indication of the gender and/or age with a result of an analysis of a biometric template from the plurality of biometric templates. The comparison can be manual or automated in various embodiments.

In still other embodiments of the enrollment method, in addition to, or in the alternative to receiving and verifying age and/or gender, the enrollment method comprises comparing a biometric template of the plurality of biometric templates of the user against a plurality of biometric templates of barred users and denying enrollment to the user based on a match between the biometric template of the plurality of biometric templates and one of the plurality of biometric templates of the barred users.

The present invention also provides methods for preventing a first user from making certain misrepresentations in a social network. An exemplary method comprises enrolling the first user by associating the first user with a user ID, associating the user ID with a biometric template of the first user. The exemplary method also comprises providing a prompt to the first user, and storing a biometric response of the first user thereto in association with the user ID. The method further comprises receiving a request from a second user of the social network to authenticate the first user of the social network, and sending to the second user at least a portion of the biometric response of the first user, or at least a portion of the biometric template of the first user. In various embodiments the at least the portion of the biometric response or biometric template of the first user comprises at least a portion of a biometric login response.

DETAILED DESCRIPTION

Figure 1:
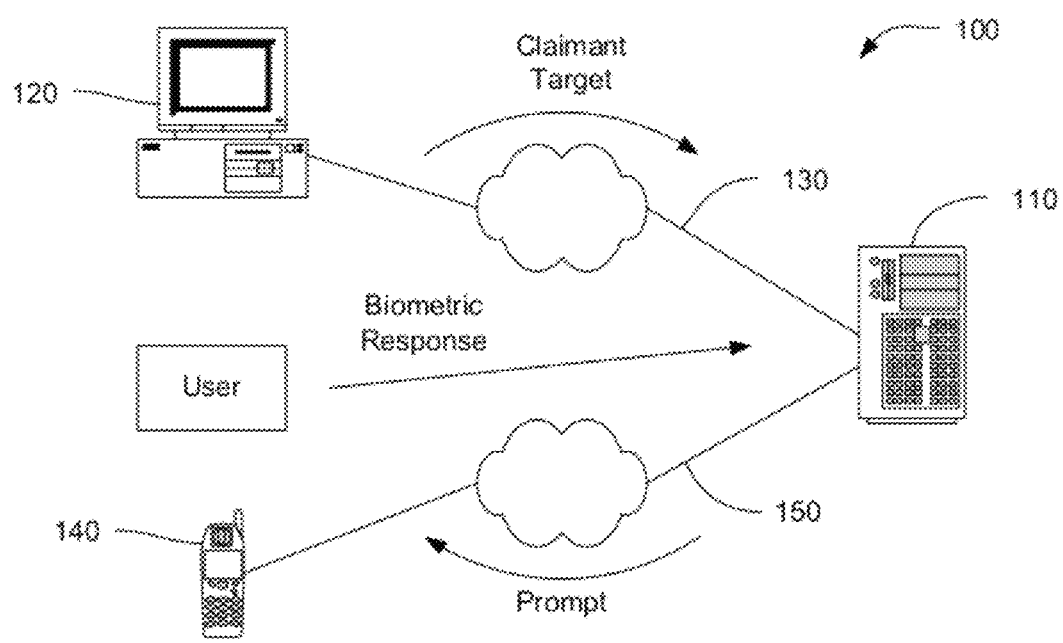
FIG. 1 is a schematic representation of an exemplary environment for carrying out various methods described herein.

The present disclosure is directed to systems and methods for authenticating users of social networks to prevent or at least deter impersonation and misrepresentation. Authentication for social networks can achieve these ends, according to the present invention, by the use of an authentication system that employs a number of security features in combination, including some biometric security features. These security features can be based, for example, on unique knowledge of the legitimate user, a unique thing that the user has, unique personal features and attributes of the user, the ability of the user to respond, and to do so in a fashion that a machine cannot, that only a fraction of the authentication information is made available in any one authentication attempt, and so forth.

The methods described herein comprise an initial enrollment and subsequent authentications. In the initial enrollment process, an enrollee user is associated with a user ID and that user ID is further associated with the address of a communication device for the user. The user is also asked to provide biometric samples in response to a plurality of different prompts. The prompts and responses are also associated with the user ID. After enrollment, a person seeking to be authenticated, termed a claimant herein, first submits a claimant target which can be the user ID or some other unique identifier from which the authentication system can infer the particular identity sought to be authenticated. One of the prompts associated with the user ID is then provided to the claimant, the claimant provides a biometric response to the prompt, and that response is compared to the biometric sample previously associated with that prompt. Within this simple framework a variety of security features can be effectively employed.

One such security feature is achieved through the use of biometrics which provides security based on the uniqueness of various personal features, attributes, and behaviors such as one's fingerprint, voice, eyes, face, genetic material, scent, signature, and so forth. Another security feature can be achieved through the use of responses to prompts which require the user's unique knowledge to respond correctly. In some instances, multiple pairs of prompts and responses are stored, though only one pair need be used for any authentication attempt. In these embodiments, another security feature is realized because only a fraction of the authentication information is made available in any one authentication attempt. Still another security feature can be achieved by implementing a rule that the same prompt from the plurality of prompts cannot be used in successive authentications. This rule makes it more difficult to record the biometric response from a legitimate authentication and replay that response in a fraudulent authentication attempt.

Yet another security feature can be achieved through the use of two channels of communication between the authentication system and the claimant. To complete the authentication, a second communication channel is established using the device address recorded during the enrollment process. The second channel is different from the communication channel over which the authentication system received the claimant target. Here, the prompt is provided to the claimant over the second channel, and/or the biometric response to the prompt is returned to the authentication system over the second channel. The use of the second channel to the device associated with the previously recorded device address makes fraudulent activity more difficult because a party seeking to perpetrate a fraud would need to have access to some unique thing that the enrolled user has, such as a cell phone. Still further security features, described in more detail below, can also be employed.

Within the context of a social network, the invention can be used to prevent both impersonations and misrepresentations. Turning first to the problem of impersonation, the invention can prevent a claimant from accessing the account of another user without the authorization of that user in order to impersonate that user. In a social network that implements the present invention, a user can choose to disclose their true identity or remain anonymous and only be identified by a screen name, for example. In either instance, however, the present invention assures that only the legitimate user can access their account and post content and communicate with others from that account. An impersonator that approaches the social network as a claimant will be prevented from logging into any account that the claimant is not authorized to access.

According to the present invention, impersonation in social networks is prevented by requiring that users go through a brief enrollment process in which biometric templates such as facial recognition and voice templates are stored. In the enrollment process, some of these biometric templates are associated with prompts, as described above. Subsequently, when a claimant seeks to access an existing account, the claimant is authenticated either using a multi-channel multi-factor authentication process, or using a single-channel multi-factor authentication process as described in U.S. patent application Ser. Nos. 12/119,617 and 12/137,129, respectively.

Turning next to the problem of misrepresentations in a social network, during the enrollment process users can make certain representations about themselves, whether they disclose their true identity or remain anonymous behind a fabricated screen name. Such representations include gender, age, race, hair color and so forth. Embodiments of the present invention allow certain representations to be authenticated. Users that are willing to have their representations verified by the social network, in some embodiments, are classified as certified users. Certified and uncertified users represent two classes of users in the social network, and the two classes can be afforded different rights and subjected to different rules by the social network.

For instance, the enrollment process can comprise an enrollee speaking to a video camera in response to a prompt. Here, the authentication system 110 is able to capture both a facial recognition template and a voice template of the enrollee. The social network can then attempt to verify representations made during the enrollment process against these biometric templates. In this way, a middle aged sexual predator cannot easily misrepresent himself as a teenage girl, for example.

Verifications of representations made during the enrollment process, or subsequently, can be performed manually or automatically. For example, a person acting on behalf of the social network can manually compare age and gender representations made by an enrollee against the enrollee's facial recognition template and make a determination as to whether the enrollee is making false representations. Some automated systems, such as VoiceVault, are able to estimate a person's age and determine the person's gender based on voice samples. Accordingly, the authentication system 110 can be configured to automatically screen enrollees to verify age and gender representations. Representations that fail the screen, in some cases, can be reviewed by a person acting on behalf of the social network.

As already noted, in some embodiments, a social network that screens enrollees for misrepresentations can classify those users that pass the screening as certified users. In some social networks, submission to the screening process is optional so that an enrollee can opt to become a certified user or not, either at the time of enrollment or subsequently. In those embodiments in which certification is optional, users can be enticed to become certified, for example, through rate reductions, special offers, or the availability of additional features and/or services that are made available only to certified users.

Certified users can be identified as such to other users of the social network, in some embodiments, for example with a frame around a profile picture. Additionally, where a social network has a sub-population of certified users, the social network can offer parental controls that limit contact to only certified users, and further, to only those certified users that fit one or more criteria. In this way, a parent can limit a child's access through a social network to only those certified users that are girls under the age of 20, for example.

Within the context of a social network, the invention can also allow one user to authenticate a certified user to help the first user assess the certified user's trustworthiness before accepting messages, communications, content, or the like. For example, stored biometric templates or subsequent biometric responses to prompts made by the certified user can be viewed, in whole or in part, by other users before accepting contact or content form the certified user. For instance, when a user (certified or not) receives an invitation to join a group or share photographs, the social network can make available selected portions of a login video, for instance, of the certified user that is extending the invitation.

It should be appreciated that empowering social network users to assess the trustworthiness of other users through stored biometric templates or biometric responses affords users an opportunity to see and hear another user and make a more informed judgment as to whether to engage the other user. The social network, in some embodiments, provides a mechanism by which a user can report suspected frauds or misrepresentations, either to the social network itself, and/or to other users, and/or to police.

Beyond the actual preventative actions noted above, the present invention can also have a deterrent effect on those seeking to either misrepresent themselves or impersonate others within a social network. Enrollment and authentication logic (see FIG. 4, below) can each be configured to require that the enrollee, or claimant, provide a video image and can be further configured to notify the enrollee or claimant that the biometric information being submitted is being recorded and stored. Thus, the enrollee or claimant is on notice that his image, and other biometric data such as voice samples, are being recorded and can be used like fingerprints from a crime scene to help identify the enrollee or claimant should the social network be used for illegal purposes. While such notice alone may not bar a claimant from making misrepresentations or attempting to impersonate another user, as noted elsewhere herein, such notice can provide a powerful deterrent against trying.

FIG. 1 shows an exemplary environment 100 for carrying out various methods described herein. The environment 100 comprises an authentication system 110 in communication with a first device 120 over a first communication channel 130, and in communication with a second device 140 over a second communication channel 150. The authentication system 110 can comprise one or more servers, data storage devices, workstations, and the like, networked together and configured to perform the functions described herein. The authentication system 110 is preferably implemented in a secure environment to prevent both external and internal tampering. In some embodiments, the authentication system 110 is part of a social network computing system, such as the computing systems that provide the functionality of a social network, like FaceBook and MySpace) to its users. The authentication system 110 is configured to implement authentications, described in more detail with respect to FIG. 3, and in some embodiments the authentication system 110 is also configured to implement user enrollment. Alternatively, enrollment can be implemented by a separate system in communication with the authentication system 110. The enrollment process is described in detail with respect to FIG. 2.

To implement an authentication, in various embodiments, the authentication system 110 receives a claimant target from the first device 120, sends a prompt to the second device 140, receives a biometric response from either the first device 120 or the second device 140, and compares the biometric response with the biometric sample that was previously associated with the prompt. Biometric responses, as well as biometric samples which are also referred to herein as a biometric signatures or biometric templates, are discussed in greater detail below. Upon completion of a successful authentication, the authentication system 110 may communicate the successful result to either or both of the authenticated user and other parties to a transaction. The authentication system 110 is discussed further with respect to FIG. 4.

The first device 120 is a communication device that can communicate a claimant target to the authentication system 110. Exemplary first devices 120 include servers, personal computers (PCs), laptops, personal digital assistants (PDAs), cell phones, smart phones (such as Treos, BlackBerries, etc.), kiosks, and so forth. The claimant target can simply be, for example, the user ID associated with the user during the enrollment process. The claimant target can also be a biometric input that has been associated with the user ID, such as a scan of a fingerprint. A biometric input can be indistinguishable from a biometric response (e.g., both can be an iris scan), but are referred to herein by separate terms to distinguish between their uses in the various methods. In other words, a biometric input is used as a claimant target to indicate the identity sought to be authenticated, while a biometric response is provided in response to a prompt sent from the authentication system to authenticate the claimant.

In those instances where the claimant target is a string of alphanumeric characters, an e-mail address, or the like, the first device 120 can comprise a keypad, keyboard, touch-sensitive screen, or the like on which the claimant target can be entered. Where the claimant target is a biometric input, the first device 120 can comprise a camera capable of taking still images and/or providing video images. The first device 120 can also include other biometric entry devices such as a touch pad for recording signatures, an iris scanner, a fingerprint reader, and so forth. Biometric inputs and responses are discussed in greater detail below.

It should be noted that in some instances the claimant sends the claimant target from the first device 120, while in other instances another party to the transaction, such as a merchant, a financial institution, or another individual sends the claimant target to/from the first device 120. Thus, in the former situation the first device 120 may be a device in the claimant's home, such as a PC, interactive TV system, gaming console, or the like, or a hand-held device that the claimant carries, such as a smart phone or PDA. The claimant can also send the claimant target from a first device 120 such as a kiosk or a terminal in a retail store, for example. In the latter situation, where the other party sends the claimant target, the first device 120 may be physically remote from the claimant, such as a web server (this is sometimes referred to as a Cardholder-Not-Present (CNP) transaction environment). In some of these embodiments, the first device 120 stores the claimant target (e.g., an on-line retailer can store the claimant targets of registered shoppers for their convenience) or receives the claimant target from the claimant at the beginning of the authentication process. In still other embodiments, the first device 120 can be a surveillance station, such as a closed-circuit TV (CCTV) camera, that sends a video feed to the authentication system. The video feed includes images of faces of people, and those images constitute claimant targets. As one example, a store can monitor people entering through a door and begin the authentication process for quicker and easier checkout.

The second device 140 is something the enrolled user possesses, or at least has ready access to. Exemplary second devices 140 include cell phones, PDAs, smart phones, pagers, PCs, home phones, etc. The second device 140 is something that is unique to the user in as much as the second device 140 is characterized by a unique device address such as a phone number, IP address, URL, e-mail address, etc. In various embodiments, the second device 140 is able to receive and render a prompt from the authentication system 110 and/or transmit a response thereto. The prompt can be provided by the second device 140 visually, aurally, or in combination, for example. For instance, the prompt can be displayed as a text message, a verbal command or cue, an audio clip, a video clip, etc. In some instances, the second device 140 can be used by the claimant to provide the biometric response to the authentication system 110. Towards this end, the second device 140 can include a camera capable of taking still images and/or providing video images. The second device 140 may also include other biometric entry devices such as the ones noted above.

It should be appreciated that the use of still images or video images as the biometric response for authentication purposes provides a powerful security feature, in some embodiments. In particular, part of the prevalence of identity theft and electronic fraud lies in the anonymity associated with electronic transactions. It is a very strong deterrent to such malfeasance, however, to have to expose one's face to surveillance in order to perpetrate the fraudulent activity. With the advent of readily available and inexpensive webcams and cameras on cell phones, for example, the widespread implementation of a system that employs video for biometric responses becomes practical.

This is especially useful for social networks, where a need has existed since the inception of on-line communities for the ability for users to positively authenticate one another. Presently, the typical login system that requires a combination of a username and a password does not provide positive authentication of users to the extent that one user cannot tell whether the other user is misrepresenting them self or impersonating another. Thus, even if a user of a social network chooses to employ a screen name and otherwise remain anonymous (i.e., not positively identified), the user still records biometric responses that allows the person to log back into the social network, and that can optionally be shown to other users and/or used to prevent the login and the re-enrollment of users that should become barred from the social network. Thus, the present invention provides social networks the ability to positively authenticate users at login, allows users the ability to positively authenticate each other, and allows the social network the ability to exclude users that violate rules, for example.

The first and second communication channels 130, 150, extend between the authentication system 110 and the first and second devices, 120, 140, respectively. The first and second communication channels 130, 150 can be fully duplexed and can each comprise connections made through networks, represented generally by clouds in FIG. 1, such as the public switched telephone network (PSTN), wireless telephone networks, the Internet, wide area networks (WANs) and local area networks (LANs). It should be noted that although each of the first and second communication channels 130, 150 are represented in FIG. 1 as connecting through only one such cloud, either communication channel 130 or 150 can comprise a connection through more than one network and both communication channels 130 and 150 can cross the same network.

It will also be understood that the authentication system 110 can comprise further channels to facilitate communications with other parties to a transaction with a claimant. As described more fully below, a merchant may request an authentication over a third channel (not shown), the authentication then proceeds over the first and second channels 130 and 150 between the claimant and the authentication system 110, and then confirmation of the authentication is sent to the merchant over the third channel.

Figure 2:
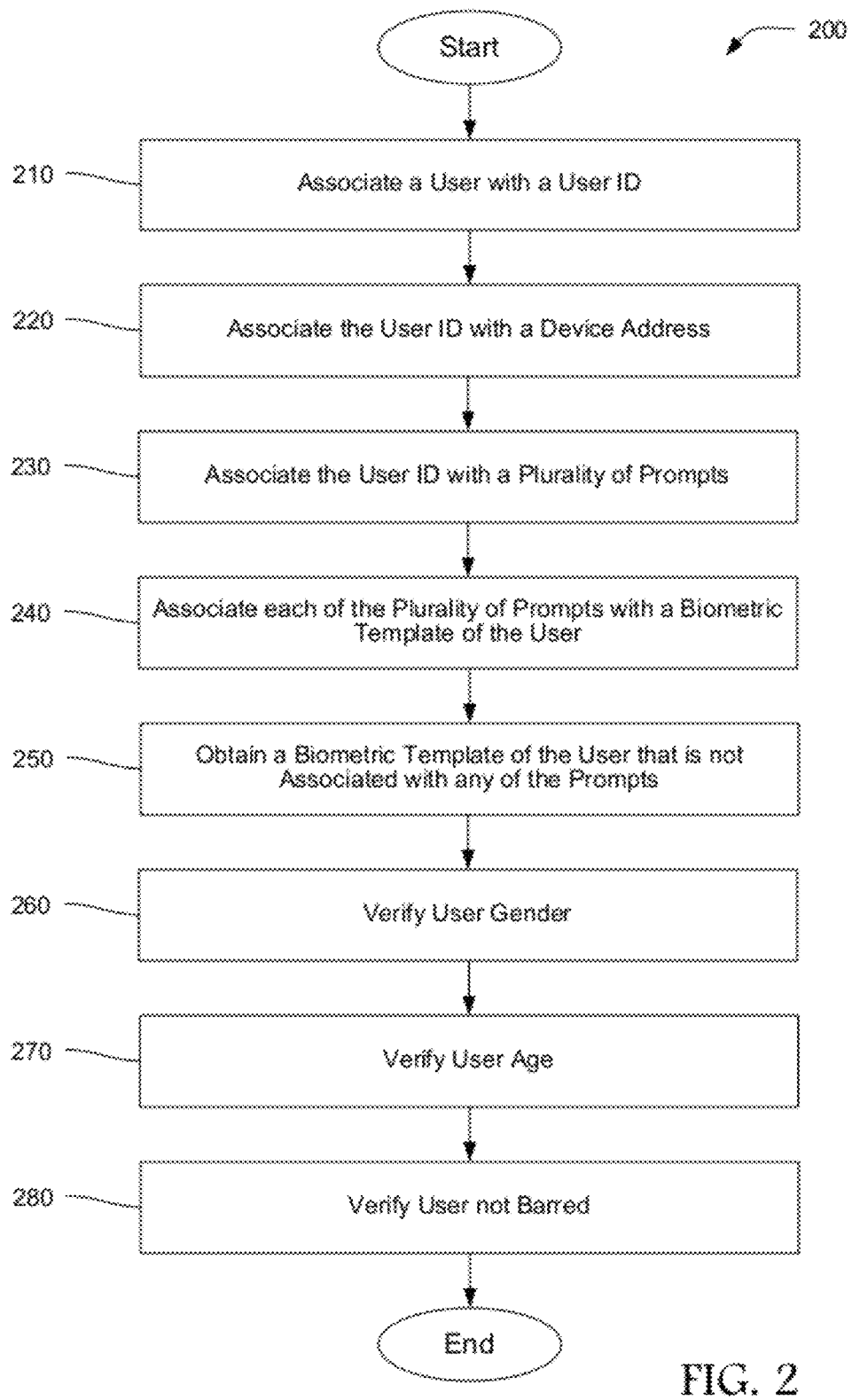
FIG. 2 is a flow-chart representation of an enrollment method according to an exemplary embodiment.

FIG. 2 illustrates an exemplary method 200 for enrolling a user, for example, into an on-line community such as a social network. The method 200 comprises a step 210 of associating a user with a user ID, a step 220 of associating the user ID with a device address, a step 230 of associating the user ID with a plurality of prompts, and a step 240 of associating each of the plurality of prompts with a biometric template or signature of the user. The method 200 can also comprise, in some embodiments, a step of obtaining a biometric template of the user that is not associated with any of the prompts. The method 200 can be implemented, in some embodiments, by communicating with an enrollee user through a kiosk or over the Internet. It should be appreciated that method 200 can be fully performed by a computing system interacting with the enrollee user and does not require, in some embodiments, the intervention of a trusted individual acting on behalf of the on-line community.

In the step 210, the enrollee user is associated with a user ID. This can comprise, for example, assigning a unique numeric or alphanumeric code to the user, or having the user select a unique numeric or alphanumeric code. In some embodiments a password is optionally assigned to, or selected by, the user as an additional security feature. The user ID can also be, in some instances, a biometric template. For example, a file containing a list of features extracted from the user's fingerprint (i.e., a fingerprint template) is one such possible user ID. In some embodiments more than one user ID is associated with the user so that the user can seek authentication multiple ways, such as by entering a code or presenting a finger to a scanner, for example. Step 210 can further comprise providing the user with a token including the user ID, such as a magnetic swipe card, a fob, an RFID tag, etc.

As described in the subsequent steps of the method 200, the user ID is further associated with additional information pertaining to the enrollee user. The user ID and such further information can be stored as records in relational databases, or in other data storage configurations, for later retrieval during an authentication. In addition to the information described below in steps 210-250, other information that can be associated with the user ID through the enrollment method 200 includes addresses, spending limits, access levels, and other third party management information system attributes. Such additional information can be stored locally, or can constitute a link or pointer to a record in an external database.

In step 220 a device address is associated with the user ID. The device address is unique to a communication device that the user has, or has ready access to, such as the second device 140 (FIG. 1). Step 220 can include receiving the device address from the user, for example, where the user enters the device address into a text box in an on-line enrollment form. In some embodiments, receiving the device address from the user comprises reading the device address directly from the communication device. In some instances, where the user has more than one communication device, a device address for each can be associated with the user ID.

The user ID is further associated with a plurality of prompts in step 230. The prompts can include common prompts such as "Say your mother's maiden name," and "Sign your name on the signature pad." In some embodiments, the user selects some or all of the plurality of prompts from a list of predefined prompts such as the common prompts noted above. The prompts selected by the user are then associated with the user ID. In other embodiments, a plurality of predefined prompts is automatically assigned to the user. In some embodiments, still other prompts that can be associated with the user ID are personalized prompts. As used herein, a personalized prompt is a prompt created by the user, for example, "Say the rhyme your daughter loves." The personalized prompts can be recorded in the user's own voice, or entered as text, for example. The number of prompts in the plurality of prompts can be two or more, but preferably is a number that strikes a balance between the security offered by greater numbers of prompts and the burden on the user to enroll large numbers of prompts and associated responses. In some embodiments, the number of prompts is 5, 6, 7, 8, 9, or 10 at the time of enrollment, and may be increased subsequently.

It should be appreciated that the use of a personalized prompt for authentication purposes provides a powerful security feature, in some embodiments. In particular, part of the prevalence of identity theft and electronic fraud lies in the availability of information through contracts and electronic databases. Prompts including questions such as "what is your mother's maiden name?" and "what is the name of your youngest sibling?" are easily discovered through contracts or Internet searches. A personalized prompt such as "color of my teenage dream car" is not readily known and whose response cannot be easily identified even by a spouse. With the increase in identity theft and a significant part of identity theft being perpetrated by family members, personalized prompts present a significant hurdle for even a person's closest associates.

In step 240 each of the plurality of prompts is associated with a biometric template of the enrollee user. For example, where the prompt is an instruction to say some word or phrase, the biometric template can be a voice template derived from the user saying the word or phrase. Here, associating the prompt with the biometric template can include providing the prompt to the user and receiving audio data (e.g., a .wav file) of the user's response. Associating the prompt with the biometric template can further include, in some instances, processing the received audio data to extract the biometric template. The biometric template can be, in some embodiments, a filtered or enhanced version of the originally received audio data, such as with background noise removed, or averaged over multiple repetitions by the user. The biometric template can also include a set of markers or values derived from the audio data.

Other examples of biometric templates include fingerprint templates derived from users' fingerprints; signature templates derived from users' signatures, and in some instances also derived from aspects of the act of creating the signature such as rate and pressure of the writing implement as a function of time; facial recognition templates derived from still or video images of users' faces; iris scan templates derived from users' iris scans; and so forth. A biometric template can also comprise an unprocessed biometric response, such as a .wav file of the user's voice, a .jpg file of an image of the user's face, etc. Both biometric templates and prompts can be stored in association with the user ID in a database, for example.

It will be appreciated that the biometric template associated with any particular prompt need not make sense to anyone other than the user, adding still another security feature in some cases. For example, the user can create the prompt "Monday morning" and associate with that prompt a biometric template derived from saying "marvelous marigolds." Even if someone were to sample enough of the user's voice to reasonably model the user's voice, it would be virtually impossible to know the correct response to the particular prompt.

In some embodiments step 240 includes the use of voice recognition. Voice recognition is distinguished here from voice identification in that voice recognition can distinguish spoken words independent of the speaker, whereas voice identification associates the individual with the acoustics of the phrase without regard for the meaning of the words spoken. Thus, for instance, a user can create a personalized prompt by saying a phrase and then voice recognition can be employed by the authentication system to extract the phrase from a recording of the user saying the phrase. The extracted phase can then be stored as the biometric template, as a component of the biometric template, or as a completely separate record. Likewise, the system can prompt the user to say a few randomly selected words and use voice recognition to verify those words were spoken. In addition, voice identification (biometric comparison) can be applied to the same sample to insure that the user spoke the randomly selected words thus verifying authenticity of the response.

Step 250 is an optional step that comprises obtaining a biometric template of the user that is not associated with any of the prompts. For example, enrolling the user can comprise capturing a digital image of the user's face. The image can be associated with the user ID but not with any particular prompt. Should the user have problems with a subsequent authentication and end up speaking with a live operator, provided that the communication with the live operator is over a video conference or something similar, then the operator can compare the stored digital image of the user's face with the image of the claimant. Additionally, method 200 can optionally comprise associating additional user information with the user ID. Examples of additional user information include home address, home phone number, credit card numbers, system preferences and user settings, and so forth.

In some embodiments, the enrollment method 200 optionally includes a step 260 of verifying the gender of the enrollee user. Step 260 can comprise, in some embodiments, receiving an indication of the enrollee user's gender, and comparing the indication with the result of an analysis of a biometric template from the plurality of biometric templates. An example of an indication of the enrollee user's gender can be, for example, a representation of gender made through an on-line enrollment form. Some automated systems, such as VoiceVault, are able to determine a person's gender based on voice samples. An analysis by such an automated system of a voice sample, such as a biometric voice template made by the enrollee user, yields a result, either male or female, that can be compared against the indication of gender to verify the gender. In the alternative to the automated analysis, a manual comparison can be performed in step 260 in which a human evaluates the biometric template for gender and compares the result to the indication of gender from the enrollee user.

In some embodiments, the enrollment method 200 optionally includes a step 270 of verifying the age of the enrollee user. Step 270 can comprise, in some embodiments, receiving an indication of the enrollee user's age, and comparing the indication with the result of an analysis of a biometric template from the plurality of biometric templates. An example of an indication of the enrollee user's age can be, for example, a representation of age made through an on-line enrollment form. Some automated systems, such as VoiceVault, are able to estimate a person's age based on voice samples. An analysis by such an automated system of a voice sample, such as a biometric voice template made by the enrollee user, yields a result, such as an age range, that can be compared against the indication of age to verify the age. In the alternative to the automated analysis, a manual comparison can be performed in step 260 in which a human evaluates the biometric template for age and compares the result to the indication of age from the enrollee user.

Yet another optional step 280 comprises verifying that the enrollee user has not been barred from the social network. For example, step 280 can comprise comparing a biometric template of the plurality of biometric templates of the first user against a plurality of biometric templates of barred users. If the result of the comparison is a match, indicating that the enrollee user is the same individual as one who has previously been barred from the social network, than enrollment can be denied to the enrollee user based on the match.

Figure 3:
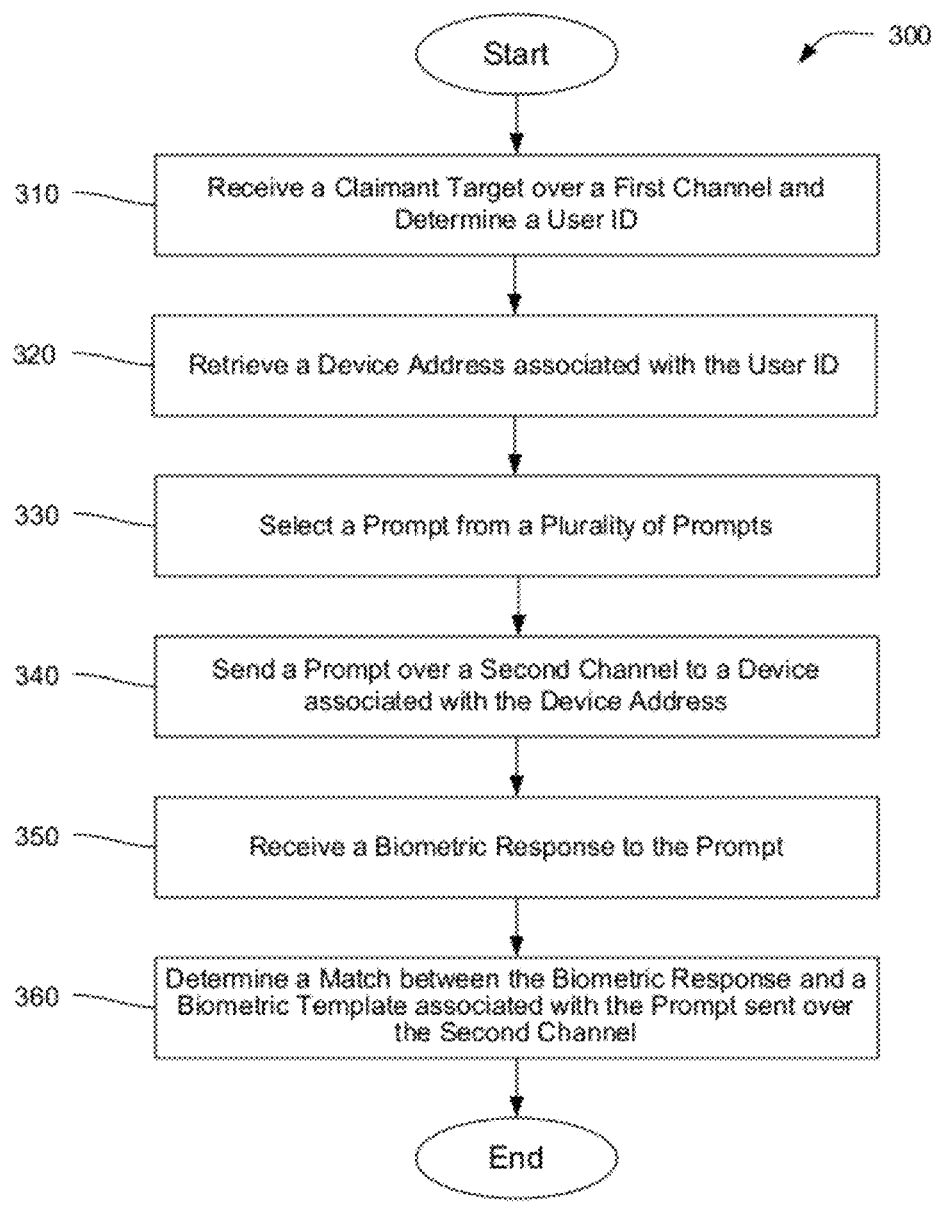
FIG. 3 is a flow-chart representation of an exemplary authentication method according to an exemplary embodiment.

FIG. 3 illustrates an exemplary method 300 for authenticating a claimant, such as a user of a social network seeking to log back in to their account. The method 300 comprises a step 310 of receiving a claimant target over a first channel, a step 320 of retrieving a device address associated with the user ID, an optional step 330 of selecting a prompt from a plurality of prompts where each of the plurality of prompts is associated with a biometric template of a user, and a step 340 of sending a prompt, such as the prompt selected in step 330, over a second channel to a device associated with the device address. The method 300 further comprises a step 350 of receiving a biometric response to the prompt, and a step 360 of determining a match between the biometric response and a biometric template associated with the prompt sent over the second channel.

In step 310 a claimant target is received over a first channel. In some embodiments the claimant target comprises a user ID, while in other embodiments the method 300 further comprises determining the user ID from the claimant target. In some embodiments where the claimant target comprises the user ID, the user ID can be a numeric or alphanumeric character string, for example, such as an e-mail address or a user name selected by an enrollee user during the enrollment method 200 (FIG. 2). In other embodiments where the claimant target comprises the user ID, the user ID is a template such as a fingerprint template or an iris scan template. As one example, a fingerprint scanner on a kiosk scans the claimant's fingerprint, reduces the scan to a fingerprint template, and then sends the template to the authentication system which receives the template as the claimant target.

As note previously, in some instances the claimant target is not the user ID itself, and in these embodiments the method 300 further comprises determining the user ID from the claimant target. Returning to the prior example of the claimant at the kiosk, the kiosk could instead transmit to the authentication system the scan of the fingerprint without further processing. Here, the authentication system would further determine the user ID from the claimant target by reducing the scan to the fingerprint template.

In some embodiments, step 310 also comprises receiving an authentication request, which in some embodiments precedes receiving the user ID and in some embodiments includes the user ID. For example, a claimant seeking to complete a transaction with another party can send an authentication request including her user ID to the authentication system. Similarly, the authentication request, including the user ID, may come from another party, such as a merchant. In still other embodiments, either the claimant or the other party to the transaction can make the request for authentication and subsequently the claimant is prompted by the authentication system to submit the user ID. It should be noted that in some embodiments that claimant also supplies a password with the user ID, while in other embodiments a password is not required. Thus, in these latter embodiments, step 310 specifically does not comprise receiving a password.

After step 310, a device address associated with the user ID is retrieved in step 320. The device address can be retrieved, for example, from a database that associates device addresses with user IDs. Step 320 can also comprise retrieving a record associated with the user ID, where the record includes one or more device addresses as well as other information such as prompts and biometric templates.

In optional step 330 a prompt is selected from a plurality of prompts, where each of the plurality of prompts has a biometric template of the claimant associated therewith. In some embodiments, the plurality of prompts is ordered, say from first to last, and the act of selecting the prompt simply comprises identifying the next prompt in the order based on the last prompt used. Other embodiments employ randomization algorithms. A rule can be implemented, in some embodiments, that the same prompt from the plurality of prompts cannot be used in successive authentications. Similar rules can be implemented to prevent the same prompt from being employed twice within any three authentications, and so forth. Yet another rule that can be implemented applies where several of the biometric templates each include voice data comprising at least two syllables. Here, the rule requires that the same two syllables used in one authentication cannot be used in the next subsequent authentication.

In step 340, a prompt is sent over a second channel to a device associated with the device address. The device may be a cell phone, PDA, smart phone, PC, and so forth. In the limiting case where there is only a single prompt associated with the user ID, for example, the step 330 of selecting a prompt from a plurality of prompts is unnecessary and step 340 simply comprises sending the one prompt. Where the prompt is selected in step 330 from a plurality of prompts, step 340 comprises sending the selected prompt. In some instances, the prompt is sent in a text message according to the Short Message Service (SMS) communications protocol. In other embodiments, the prompt is delivered as a voice transmission such as an audio recording or as synthesized speech. The prompt can similarly comprise a video transmission. The prompt can also be sent as an e-mail or an Instant Message.

It should be noted that instructions can also be sent to the claimant, over either channel, in addition to the prompt. As one example, the claimant submits a claimant target over a first channel from a PC, and receives a prompt on her cell phone over a second channel. The prompt is a text message of the word "Rosebud." An instruction can be sent over the first channel to be displayed on the PC such as "A prompt has been sent to you. After the red light appears on your screen, face the webcam and provide your response to the prompt." Still another security feature lies in the fact that it is not readily apparent from an instruction how the prompt should be received. Someone intercepting the instruction would not readily know whether the prompt was sent to a web browser, in an e-mail, or to a mobile device, for example.

After step 340, a claimant receives the prompt and acts accordingly to produce some biometric response. For example, the claimant can speak to a microphone, present her face or another body part to a camera, make a gesture in front of a camera, press her finger on a fingerprint scanner, present her eye to a retinal scanner, write on a touch-sensitive pad, or combinations of these. The biometric response is therefore some product of the claimant's actions such as a voice data, a fingerprint scan, retinal scan, or an image of the person's face or body part, for example. The biometric response can comprise unprocessed data, partially processed data, or can be completely reduced to a template, for example.

The method 300 further comprises the step 350 of receiving the biometric response to the prompt. The biometric response can be received from the same device that received the prompt, or in other embodiments from the same device that sent the claimant target. The biometric response may even be received from a third device over some third channel, in some embodiments.

Step 360 comprises determining a match between the biometric response and a biometric template associated with the prompt sent over the second channel. In a simple example, the biometric template comprises a facial recognition template of a user and the biometric response comprises a segment of streaming video that includes frames showing the claimant's face. Here, determining the match comprises extracting a facial recognition template of the claimant's face from the frames of the video segment and comparing that facial recognition template to the original facial recognition template of the user.

It will be appreciated, moreover, that step 360 can comprise matching more than one biometric template to the biometric response. For instance, in the above example, the segment of streaming video can also include the claimant saying a phrase. Here, a voice template can be extracted in addition to extracting a facial recognition template. In this example a match can be determined between a voice template and the voice in the video, and a match can be determined between a face template and the face in the video.

In various embodiments, determining the match between the biometric response and the biometric signature comprises determining a figure of merit that characterizes the agreement between the biometric response and the biometric template, and then comparing that figure of merit to a threshold. If the figure of merit exceeds the threshold, or in some instances equals or exceeds the threshold, then the match has been determined. Where more than one biometric template is compared to the biometric response, in some embodiments, a figure of merit for each biometric template is calculated and each figure of merit is compared to the relevant threshold.

In those embodiments where the biometric response comprises a vocal response from the claimant, determining the match between the biometric response and the biometric template in step 360 can comprise performing voice recognition on the biometric response to determine whether the correct word or words were spoken. Voice recognition has the benefit of being less computationally intensive than voice identification, therefore, a useful screen can be to employ voice recognition to determine whether the correct word or words are present in a biometric response.

If the match cannot be determined, an optional step of the method 300 comprises repeating method 300 beginning at step 320, preferably by selecting a different prompt in step 330 than in the previous iteration. Another optional step if the match cannot be determined comprises establishing a live interview between the claimant and a customer service representative. The customer service representative, in some instances, has the authority to authenticate the claimant based on the interview. As noted previously, the customer service representative may be able to employ biometric templates that are not associated with any of the prompts to decide whether to authenticate the claimant.

Figure 4:
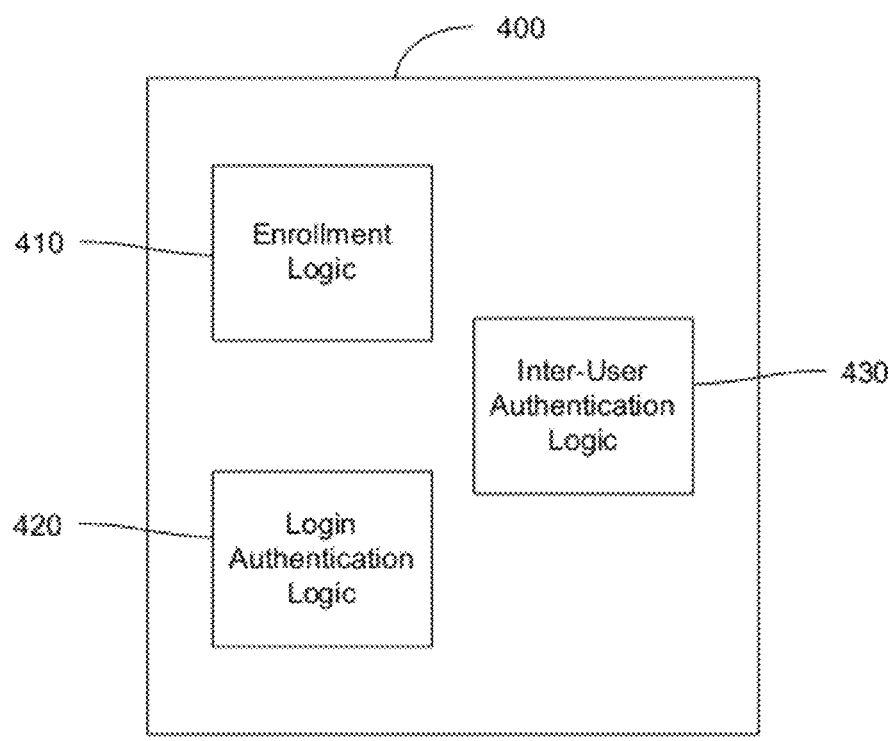
FIG. 4 is a schematic representation of an authentication system according to an exemplary embodiment.

FIG. 4 shows an exemplary embodiment 400 of the authentication system 110 (FIG. 1). The authentication system 400 of FIG. 4 comprises logic 410 configured to enroll users, login authentication logic 420 configured to authenticate claimants, and optionally inter-user authentication logic 430 configured to authenticate one user to another. In various embodiments, logics 410, 420, and 430 each can comprise hardware, firmware, software stored on a computer readable medium, or combinations thereof. Logics 410, 420, and 430 may include a computing system such as an integrated circuit, a microprocessor, a personal computer, server, distributed computing system, communication device, network device, or the like. For example, logics 410, 420, and 430 can be implemented by separate software modules executed on a common server. In other embodiments, logics 410, 420, and 430 can be implemented on different computing systems. Logics 410, 420, and 430 can also be at least partially integrated together.

The authentication system 400 can also comprise, as part of the logics 410, 420, and 430 or separate therefrom, volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing digital or analog information. Logic 410 can comprise, for instance, volatile and/or non-volatile memory as the computer readable medium on which software is stored for performing the methods described herein. Other volatile and/or non-volatile memory can comprise databases or other means for maintaining information about enrolled users including prompts, biometric templates, biometric responses supplied in response to prompts, device addresses, and the like that are accessed by the logics 410, 420, and 430. Such information can be created and revised by login authentication logic 420 and accessed by enrollment logic 410 and inter-user authentication logic 430.

The authentication system 400 can also comprise communications logic (not shown) that allows the logics 410, 420, and 430 to communicate, for example, with the first device 120 (FIG. 1) over the first communication channel 130 (FIG. 1) and the second device 140 (FIG. 1) over the second communication channel 150 (FIG. 1). In some embodiments the communications logic allows the login authentication logic 420 to interface with multiple devices in parallel to support the simultaneous enrollment of multiple users. At the same time, the communications logic allows the logic 410 to independently interface with multiple other devices to support the simultaneous authentication of multiple claimants.

The enrollment logic 410 is configured to enroll a user by performing an enrollment method such as method 200 (FIG. 2). In an exemplary embodiment, the enrollment logic 410 is configured to associate the user with a user ID, associate the user ID and with a device address, associate a plurality of prompts with the user ID, and associate a number of biometric templates each with one of the plurality of prompts. The enrollment logic 410, in some embodiments, is configured to associate the plurality of prompts with the user ID by presenting a set of pre-defined prompts to the user and receiving a selection of the plurality of prompts from the set. In additional embodiments, the enrollment logic 410 is further configured to allow the user to create a personalized prompt. The enrollment logic 410 can also comprise a computer readable medium that stores software instructions for performing these steps.

The login authentication logic 420 is configured to authenticate a claimant by performing an authentication method such as method 300 (FIG. 3) before providing the claimant with access to a particular account in a social network, in some embodiments. In an exemplary embodiment, the login authentication logic 420 is configured to receive a claimant target over a first channel, retrieve a device address associated with a user ID, send a prompt from the plurality of prompts to a device associated with the device address over a second channel, receive a biometric response to the prompt, and determine a match between the biometric response and a biometric template associated with the prompt. In some embodiments the claimant target comprises the user ID, while in other embodiments the authentication logic is further configured to determine the user ID from the claimant target. The authentication logic is further configured to send a key, in some instances, where the key can be used for encryption and/or creating a watermark. In some of these embodiments the prompt includes the key when sent. Encryption and watermarking are described in greater detail below. The login authentication logic 420 can also comprise a computer readable medium that stores software instructions for performing these steps.

The inter-user authentication logic 430 is configured to authenticate one user to another. For example, a first user sends an invitation to a second user. The second user recognizes the screen name of the first user as one used by a personal friend. Still, the nature of the invitation seems odd to the second user, so the second user requests authentication of the first user. The authentication logic 430 receives the request and in response sends to the second user at least a portion of either a biometric response of the first user, or at least a portion of a biometric template of the first user. The portion of the biometric response can be, for example, part of the biometric response given to the login authentication logic 420 during the most recent login by the first user. The portion of the biometric template of the first user can be, for example, all or part of the biometric template of the user that was acquired in step 250 and not associated with a prompt. The second user can then see, for example, a video of the first user and confirm that it is the personal friend.

Similarly, the second user may not recognize the screen name of the first user, but the first user is certified. Again, the inter-user authentication logic 430 receives a request for authentication of the first user and sends in response at least a portion of either a biometric response of the first user, or at least a portion of a biometric template. By viewing the content from the inter-user authentication logic 430, the second user can better decide whether to accept the invitation from the first user.

Figure 5:
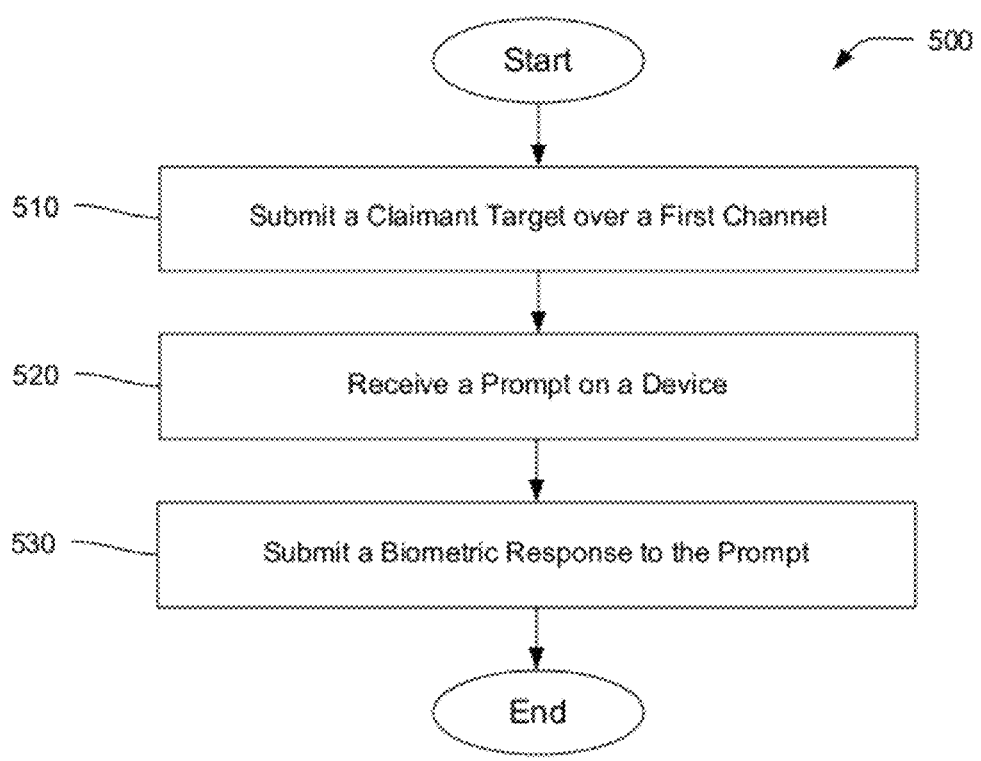
FIG. 5 is a flow-chart representation of an exemplary method for a claimant to be authenticated according to an exemplary embodiment.

FIG. 5 shows an exemplary authentication method 500 that can be performed, for example, by a claimant such as to access an on-line account in a social network. The method 500 comprises a step 510 of submitting a claimant target over a first channel, a step 520 of receiving a prompt on a device, and a step 530 of submitting a biometric response to the prompt. In method 500, one of the two steps of receiving the prompt and submitting the biometric response is performed over a second channel. In some embodiments, the claimant performing the method 500 only has to perform these three steps to be authenticated. As was the case with the enrollment method 200, it should be appreciated that method 500 can also be performed in the absence of a trusted individual acting on behalf of the on-line community. In other words, whereas prior authentication systems rely on the presence of a trusted individual to assess authenticity, in method 500 the claimant does not need to interact with a trusted individual but can interact instead merely with a computing system.

In step 510, the claimant submits the claimant target, such as the user ID, to an authentication system, for example, or to some intermediary such as a merchant that then relays the claimant target to the authentication system. Since the method 500 can be performed by a claimant seeking to complete an electronic transaction from home, work, or in public, in step 510 the claimant can submit the claimant target from a PC at home, from a kiosk in a shopping mall, or from at a terminal at a store check-out, for example. The claimant can submit the claimant target, according to various embodiments, by entering numbers and/or letters with a keyboard or keypad, swiping a magnetic card through a card reader, bringing an RFID tag within range of an RFID reader, writing with a stylus on a touch-sensitive pad, placing a finger on a fingerprint reader, speaking within range of a microphone, smiling for a camera, combinations thereof, and so forth.

Then, in step 520, the claimant receives a prompt on a device that the claimant has, or has ready access to. The device that receives the prompt may be a hand-held device such as a cell phone, PDA, or smart phone, or the device can be some other communication device such as a PC, and so forth, as described above. As also previously noted, examples of the prompt include a text message, e-mail, an Instant Message, an audio recording, a video, or synthesized speech. In some embodiments, the prompt includes a warning that if the recipient of the prompt is not seeking authentication, then an unauthorized authentication attempt is in progress and to contact the Administrator.

Next, in step 530, the claimant submits a biometric response to the prompt. The claimant can submit the biometric response, according to various embodiments, by writing with a stylus on a touch-sensitive pad, placing a finger on a fingerprint reader, placing one eye in proximity to an iris scanner, speaking within range of a microphone, speaking to a camera, combinations thereof, and so forth.

In method 500 one of the two steps of receiving the prompt 520 and submitting the biometric response 530 is performed over a second channel. For example, the claimant can submit the claimant target from a PC over a first channel in step 510, and receive the prompt with a cell phone over a second channel in step 520. Here, the claimant can provide the biometric response in step 530 over either the first channel or the second channel, in different embodiments. In another example, the claimant submits the claimant target from the PC over the first channel in step 510, the claimant receives the prompt on the PC again over the first channel (e.g., the prompt can be the following text message: "say your mother's maiden name"), the claimant's cell phone rings, and in step 530 the claimant submits the biometric response over the cell phone, here the second channel.

It will be appreciated that a method performed by an authentication system in this last example is a variant of the method 300 (FIG. 3) described above. In this variant, rather than sending the prompt over the second channel to the device associated with the device address in the step 340, a second channel is instead established to a device associated with the device address. Subsequently, rather than receiving a biometric response to the prompt in the step 350 over an unspecified channel, instead a biometric response to the prompt is specifically received over the second channel.

Additional security features that can be incorporated are further described below. For example, any of the electronic communications described herein can be encrypted according to well known encryption protocols. As another example, a watermark can be added to any biometric response sent to the authentication system. For instance, a webcam comprising a camera and a microphone can be set with a key. The key is transmitted to the user either through a secure channel or a separate channel so that unauthorized users would not be aware of the key. The watermark can be based at least in part on the key. For instance, image data can be altered by discrete cosine transform (DCT) coefficients based on the key. Of course, other algorithms can be similarly employed. Audio data can likewise be watermarked. The key used for watermarking can also be the same key employed for encryption, in some embodiments.

In the previous example, the key for the watermark can be transmitted to the claimant at the time of authentication for still further security. For instance, the prompt received over the second channel can include the key (e.g., "Please enter the following key to your webcam, wait for the red light, and then say your birth date."). For still further security, the webcam (or any other device for recording a biometric response) can include a dedicated keypad for entering the key, where the keypad is not otherwise connected to any computing system. Here, there is no electronic way to intercept the key between the device that receives the key and the keypad of the webcam. For still further security the possible keys would be non-repeating so that a fraudulent authentication attempt can be determined by detecting the use of a previously used key. Even additional security can be achieved by having keys expire within a period of time, such as 30 seconds, after being issued.

In some embodiments, the biometric entry device (e.g., webcam, fingerprint reader, etc.) does not have a dedicated keypad to enter a key. In some of these embodiments, the key can be entered through a shared keypad or keyboard. For example, a PC with an integrated webcam would allow the key to be entered on the PC's keyboard. Here, the PC can include logic that when activated, connects the keyboard to the biometric entry device and simultaneously disconnects the keyboard from the computer and disables the ability of other programs running on the PC to access key press notifications, thus rendering spyware ineffective. In some of these embodiments, the logic can render an onscreen prompt to enter the key for the biometric entry device. For further security, the logic can echo keystrokes and codes as asterisks or other characters so as not to expose the actual keystrokes.

In another embodiment, where a webcam or similar device acquires the biometric response, two video streams can be produced. The first video stream is neither encrypted nor watermarked and is displayed on a screen for the benefit of the claimant, while the second stream is encrypted and/or watermarked and sent to the authentication system. Here, anyone observing the displayed first video stream would not be able to infer that the second video stream is watermarked and/or encrypted. Having the first video stream provides the claimant with the ability to center her image in the field of view of the camera. Here, allowing the claimant to see her displayed image can potentially expose the image data to being captured with spyware. To avoid this, a further security feature comprises replacing the raw video image of the claimant with a placement indicator, such as an avatar. In this way, the claimant can center herself in the field of view by watching a representation of the claimant on the screen.

A still further security feature is achieved through hybrid prompts. A hybrid prompt is a prompt that the user selected during enrollment that is modified during authentication. For instance, the user during enrollment selects the prompt "Say your favorite movie." Subsequently, during authentication, the claimant receives the hybrid prompt "Say you favorite movie, then say spark plug." Here, the original prompt has been modified to also ask for random words or a random phrase. Voice recognition can then be employed to determine whether the words added to the original prompt were spoken in the biometric response. If so, voice identification can be applied to the portion of the biometric response that includes the response to the original prompt. Furthermore, that portion of the biometric response that includes the added random words can be saved as further biometric templates from the user.

Figure 6:
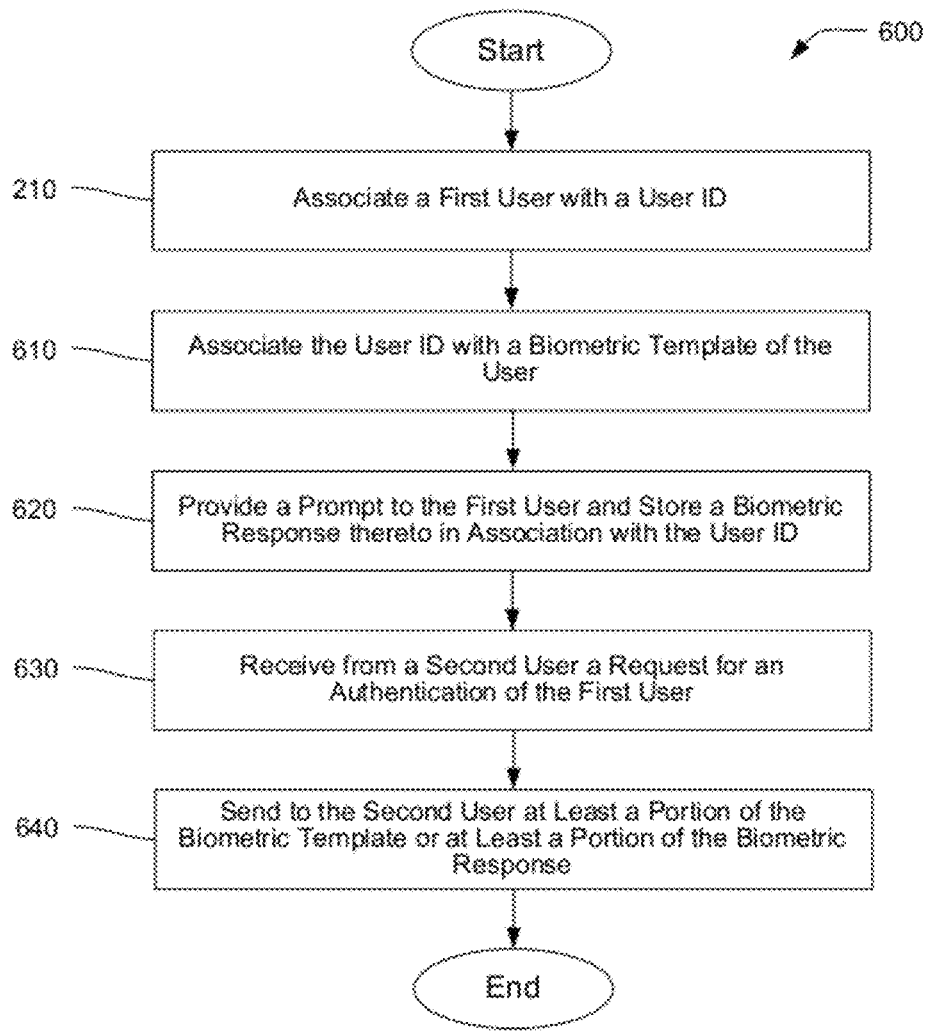
FIG. 6 is a flow-chart representation of a method for preventing a user from making certain misrepresentations in a social network according to an exemplary embodiment.

FIG. 6 is a flow-chart representation of an exemplary method 600 for preventing a user from making certain misrepresentations in a social network. The method 600 comprises the step 210 of method 200 (FIG. 2) and additionally comprises a step 610 of associating the user ID with a biometric template of a first user. Step 610 can comprise the steps 230 and 240 of method 200, in some embodiments. Method 600 also comprises a step 620 of providing a prompt to the first user and storing a biometric response of the first user thereto in association with the user ID. Step 620 can comprise the steps 340 and 350 of method 300 (FIG. 3), in some embodiments. It will be appreciated that various embodiments of method 600 can include some or all of the other steps of methods 200 and 300. Each user of the social network that follows the steps 210, 610, and 620 provides the social network with a user ID associated with two biometric samples, one recorded as a template, the other provided in response to a prompt, for example, while logging into the social network to access an account. It will be understood that in some embodiments, only the biometric template or the biometric response needs to be associated with the user ID.

Method 600 also comprises a step 630 of receiving a request from a second user of the social network to authenticate the first user of the social network. Here, the second user may wish to verify certain representations made by the first user. For instance, the second user can request authentication of the first user to verify that the first user is not an imposter impersonating the person associated with a particular screen name. In other instances, the second user can request authentication of the first user to verify that representations made by the first user about age, gender, personal appearance, and so forth are legitimate.

Method 600 also comprises a step 640 of sending to the second user at least a portion of the biometric response of the first user, or at least a portion of the biometric template of the first user. In those embodiments in which only the biometric template or the biometric response is associated with the user ID, step 640 reduces to sending at least a portion of whichever biometric sample was associated with the user ID. It will be appreciated that for certain purposes either of the biometric response or the biometric template may be more relevant. For example, to verify that a user is not an imposter, the biometric response from the most recent login event would be more relevant than a biometric template recorded when the account was first established. Steps 630 and 640 can be performed by the inter-user authentication logic 430 (FIG. 4) in some embodiments.

Figure 7:
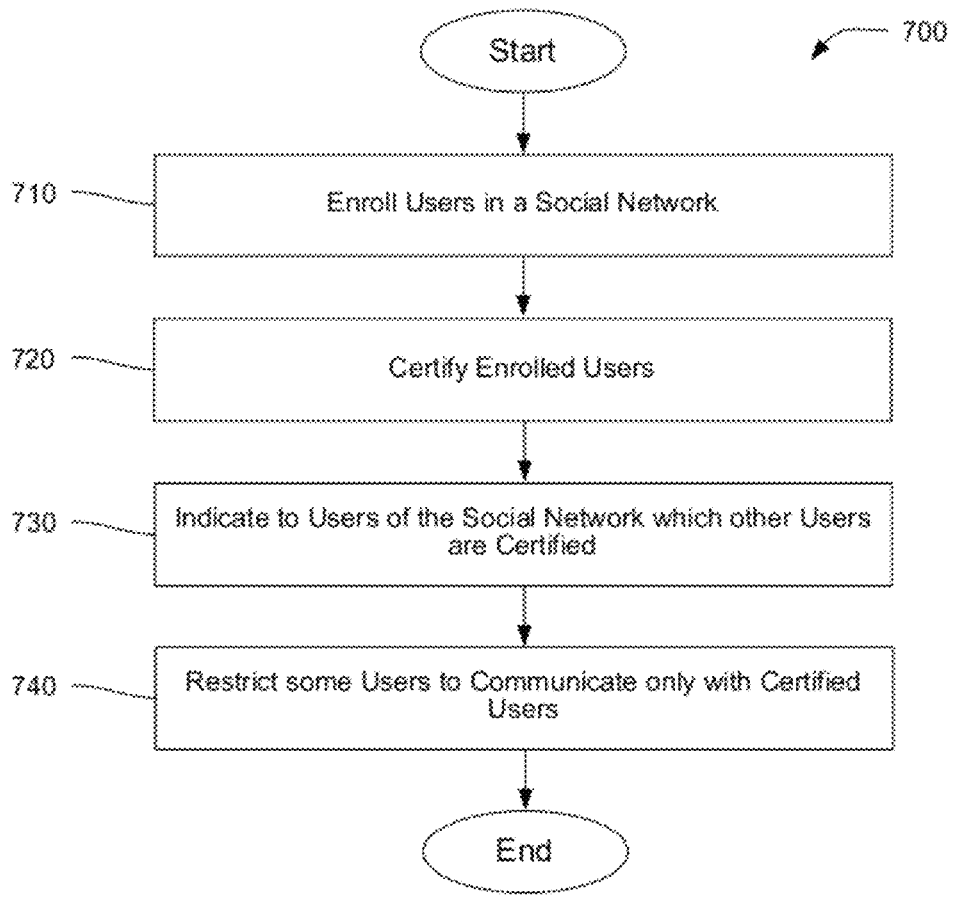
FIG. 7 is a flow-chart representation of a method for maintaining a social network according to an exemplary embodiment.

FIG. 7 is a flow-chart representation of an exemplary method 700 for maintaining a social network. The method 700 comprises a step 710 of enrolling users in the social network, a step 720 of certifying enrolled users, and a step 730 of indicating to users of the social network which other users are certified. Here, the step 710 of enrolling users includes storing in association with a user ID for each enrolled user a voice template, a facial recognition template, the user's gender, and/or the user's age. The step 720 of certifying enrolled users is performed by using the voice template or the facial recognition template to verify the gender and/or age of each certified enrolled user.

Step 730 comprises indicating to users of the social network which other users are certified. This can be achieved, for example, by a visual indicator associated with screen names or screen images of certified users. For instance, a screen names of certified users and/or their screen images (e.g., an image displayed in association with content and/or communications from a user) can be highlighted is various ways. Alternatively, or in addition, an icon can be displayed in association with certified users' screen names and/or screen images to indicate the certified status.

An optional step 740 further comprises restricting some users to communicate only with certified users. This can comprise, for example, restricting those users to communicate only with certified users that match a criterion like a gender or an age or age range. Step 740 can be implemented, for instance, in the context of parental controls so that a child is restricted to communicating with, and exchanging content with, only those other users that are certified to be children below a certain age or within a specified range of ages.

As noted previously with respect to methods 200 and 500, the present invention provides authentication of individuals without resort to a trusted individual to act on behalf of the organization, on-line community, social network, or the like. Instead, collection of biometric templates and biometric responses and the comparisons between them are performed by computing systems in these embodiments. Thus, it will be understood that the absence of a trusted individual is not restricted to being a feature of only embodiments of methods 200 and 500 but can also be a feature of embodiments of other methods described herein.

While some prior art systems do not require a trusted individual, such systems are susceptible to being fooled. A fingerprint recognition system, for example, can be fooled by a quality replica of a person's finger, or in the extreme case, by the amputated finger itself. Such a system merely verifies that a correct match was obtained but does not guarantee that the person being given access to an account (or to a secured space, or to a control system, for other examples) is truly the authorized person. Enrollment in a fingerprint recognition system, moreover, can be accomplished with an artificially generated fingerprint, for example, unless a trusted individual is present at the time of enrollment. As noted above, username/password login combinations can be guessed or stolen, so these also merely verify that a correct match was obtained, not that the person using the login combination is the authorized individual. Similarly, voice samples and other biometric data can be intercepted and replayed to defeat more sophisticated methods, so these also merely verify that a correct match was obtained, not that the person using the login combination is the authorized individual. Additionally, without a trusted individual present at enrollment, enrollment can be based on recording of other people's voices, and so forth.

The present invention will be recognized, therefore, as providing automated user enrollment, without a trusted individual, that positively ties the enrolling user to an account or other form of record, though the enrolling user may or may not still remain anonymous behind a fabricated screen name or other ID. The present invention can also, in some embodiments, verify certain representations made by the enrolling user during the enrollment, again without the involvement of a trusted individual. The present invention also provides automated authentication upon login that the individual logging in is not an imposter, again without the involvement of a trusted individual. The present invention can also provide biometric samples from either or both of the enrollment and any login event of a first user to a second user to authenticate the first user to the second user.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A social network system comprising:
    enrollment logic comprising a first microprocessor and configured to associate users with user IDs,
        store a plurality of prompts in association with each such user ID,
        store a plurality of biometric templates each in association with one of the plurality of prompts,
        compare a biometric template of the plurality of biometric templates of a first user against a plurality of biometric templates of barred users, and
        deny enrollment to the first user based on a match between the biometric template of the first user and one of the plurality of biometric templates of barred users; and
    authentication logic comprising a second microprocessor and configured to authenticate a claimant as a second user by
        receiving a claimant target,
        sending a prompt from the plurality of prompts,
        receiving a biometric response to the prompt, and
        determining a match between the biometric response and a biometric template associated with the prompt; and further configured to receive a request from a third user of the social network to authenticate the second user of the social network; and to send to the third user at least a portion of the biometric response of the second user, or at least a portion of the biometric template of the second user.

2. A method comprising:

associating users of a social network with user IDs;

storing a plurality of prompts in association with each such user ID;

storing each such user ID in association with a biometric template of the respective user;

comparing a biometric template of a first user against a plurality of biometric templates of barred users, and denying enrollment to the first user based on a match between the biometric template of the first user and one of the plurality of biometric templates of barred users;

providing a prompt from the plurality of prompts to a second user and storing a biometric response of the second user thereto in association with the user ID of the second user;

receiving a request from a third user of the social network to authenticate the second user of the social network; and sending to the third user at least a portion of the biometric response of the second user, or at least a portion of the biometric template of the second user.

3. The method of claim 2 wherein the steps of providing the prompt and storing the biometric response of the second user are steps that are performed to log into the second user's social network account.

4. The method of claim 2 wherein the step of receiving the request from the third user is performed after the step of storing the biometric response of the second user.

* * * * *